Patented Jan. 4, 1949

2,457,970

UNITED STATES PATENT OFFICE 2,457,970

PROCESS FOR PRODUCING MICROSPHERICAL SILICA GELS

James C. Bailie, Chicago, Ill., assignor to Standard Oil Company, Chicago, Ill., a corporation of Indiana No Drawing. Application August 11, 1945, Serial No. 610,404

8 Claims. (Cl. 252—259)

This invention relates to a silica catalyst and more particularly to a method of making catalysts in microspherical form. One object of the invention is to provide a method for making silica catalysts in microspherical form which are substantially free from alkali metals. Another object of the invention is to provide a method for making microspherical silica catalysts substantially free of alkali metals without the necessity of subjecting the microspherical catalyst material to troublesome washing and drying operations. A still further object of the invention is to prepare microspherical silica catalysts herein referred to as "M–S" catalysts in a single operation from the silica-containing solution to the dry M–S catalyst, without contact while soft, with any surface, thus avoiding rupture, distortion and weakening of catalyst particles. Still another object of the invention is the preparation of M–S silica catalyst free from undesirable salts or other crystallites which introduce weakness in the catalyst particles.

By the term "microspherical catalyst" I mean to include spheroidal particles which are substantially spherical in shape having a diameter less than about 300 microns and preferably particles in the range of 30 to 200 microns in diameter.

It has been found heretofore that contamination of catalysts with alkali metals in the form of their salts or oxides, has a deleterious effect on the catalyst particularly from the standpoint of catalyst life. It has accordingly been the practice in preparing catalysts of silica gel to subject the silica hydrogel to thorough washing with distilled water until the major portion of the alkali metal salt present in the silica gel, which is prepared from alkali metal silicates, is removed. Thus, in the preparation of silica gel catalysts from sodium silicate, the sodium silicate solution, for example water glass containing about 10 per cent $SiO_2$, is mixed with a strong acid such as hydrochloric or sulfuric acid and the resulting silicic acid solution is allowed to stand until coagulation has occurred. Coagulation is retarded or hastened by controlling the hydrogen ion concentration which may conveniently be regulated by adding ammonia.

The resulting stiff jelly or hydrogel is then broken up and washed with copious quantities of distilled water to remove the major portion of the sodium sulfate or sodium chloride as well as the excess acid, ammonium salts, etc. After washing, the hydrogel is subjected to drying, preferably under carefully controlled conditions, to obtain a granular silica gel with high mechanical strength. This product may be promoted by the addition of various other elements suitable for the desired purpose. Thus, in the preparation of cracking catalysts it is generally desirable to promote the silica with alumina, magnesia, zirconia, or thoria, usually in amounts of about 2 to 25 per cent.

In washing silica hydrogel or dried silica gel prepared in this way from an alkali metal silicate solution, it has been found substantially impossible to wash out all of the alkali metal salt, a small amount usually being retained in the silica gel as an adsorbed layer. Various methods have been employed to increase the elimination of alkali metal salt such as washing with other salts having a displacing effect, for example aluminum chloride, aluminum sulfate or ammonium chloride, or by washing with a strong acid such as hydrochloric acid, etc.

For some purposes it has been found very desirable to employ silica gel catalysts in the form of microspheres, i. e. fine, hard spherical particles having a diameter of the order of 30 to 300 microns. Thus, in systems employing fluidized solid catalysts, wherein the catalyst is maintained in dense fluid suspension by agitation with an upflowing gas stream, M–S catalysts have the advantage of remaining more easily fluidized, reducing the amount of erosion of equipment and, more importantly, suffering less degradation by abrasion and particle rupture. The preparation of M–S catalysts from alkali metal silicate solutions, however, has been beset by difficulties in removal of the undesirable alkali metal salts which tenaciously remain in the finished catalyst. Washing M–S silica gel catalyst often results in destruction of a substantial percentage of the catalyst particles as well as weakening of the particles, possibly owing to swelling and distortion of the particles of hydrogel by the action of the wash water or solution employed to facilitate the removal of alkali metals. Handling of the M–S silica catalyst in hydrogel form also results in mechanical rupture of the particles by the machinery employed for the purpose such as wash towers, filters, etc.

I have now found a method of making M–S silica gel catalysts substantially free of alkali metals which requires no washing of the M–S catalyst whatever following formation of the gel in spherical form. The method comprises elimination of the alkali metal from the sodium silicate solution before the formation of the M–S gel from the solution, by contacting it with an ion exchange resin which removes the alkali metal from the silicate solution, producing a stable or metastable silicic acid which I then form into droplets, for example by spraying and drying. On drying, the droplets of silicic acid are converted into microspherical hydrogel particles which on further drying become strong hard particles of M-S silica gel. The stability of the silicic acid solution may be controlled in various ways to assist in the formation of the hydrogel particles and increase the mechanical strength of the resulting M-S catalyst. Thus, by adding acid to the substantially alkali metal-free silicic acid solution, or heating it, the gelling time may be reduced to a period of a few minutes, and if the resulting solution is immediately formed into droplets as by spraying, firm particles of silica hydrogel result which, on drying, yield the desired M-S catalysts substantially free of alkali metals.

For my purpose it is preferred to employ a silicic acid solution containing about 5 to 20 per cent $SiO_2$ and this may be obtained by filtering a sodium silicate solution containing about 2 to 20 per cent of $SiO_2$ thru a suitable ion exchange resin conditioned for adsorption of the sodium ion. The more dilute solutions substantially free of sodium salt can be concentrated by vacuum evaporation at moderately low temperature to the desired concentration for converting into M-S catalyst. After the resin has adsorbed a quantity of alkali metal salt, it can be regenerated by washing with acid, e. g. HCl.

In forming the silicic acid into M-S catalysts, I may disperse it in the upper part of a chamber or tower thru which a current of drying gas is passed, preferably in an upward direction. The drying gas, which may be air, is usually supplied in heated condition to accelerate the rate of drying of the particles. The silicic acid may be dispersed by any well-known method such as impinging a stream of the silicic acid onto a rapidly rotating disc, by forcing it thru a nozzle provided with multiple orifices, for example a screen or colander, or by spraying thru a nozzle designed to impart a high velocity to the silicic acid stream and break it up into fine particles of relatively uniform size. For the manufacture of M-S catalyst for fluidized turbulent catalyst operations in the dense phase, it is preferred to disperse in the form of droplets having a diameter of about 200 to 400 microns which, on drying, results in a catalyst of about 100 to 300 microns diameter providing the silicic acid solution employed has a concentration of about 20 per cent $SiO_2$. Where the concentration of $SiO_2$ is less, e. g. 10 to 15 per cent, the shrinkage is greater and the resulting dried M-S silica catalyst is correspondingly finer.

In order to facilitate controlling the particle size, I find it convenient to regulate the viscosity of the silicic acid before spraying, and this may be accomplished by controlling the hydrogen ion concentration by the addition of acids such as hydrochloric, acetic, formic, oxalic, etc. The hydrogen ion concentration may be maintained within the range of about 4 to 7 pH. The silicic acid forms a thin, syrupy solution which can be dispersed in the form of particles of more nearly uniform size than is the case with a less viscous silicic acid of higher pH. Another method of controlling the viscosity is by the addition of certain viscosity agents such as ammonium alginate agar, tragacanth or gelatin, for example, used in concentrations of about 1 to 5 per cent, depending largely on the temperature of the operation. For the addition of viscosity-increasing agents, it is sometimes convenient to use a multi-inlet mixing spray nozzle such as the nozzle described in U. S. Patent Application Serial 579,120, filed February 21, 1945. By the use of this apparatus, instantaneous dispersion of the silicic acid after adjusting the hydrogen ion concentration can be obtained. Furthermore, various promoter metal salt solutions can be introduced into the silicic acid to produce a particular M-S silica gel catalyst for any special purpose. Thus, aluminum chloride, ammonium chromate, or aluminum nitrate solution can be conveniently added to the silicic acid before forming into microspherical droplets. Other alkali metal-free sols such as alumina sol may also be added, e. g. in amounts of 5 to 25 per cent based on the silica.

The total time required for the dispersion and drying of the silicic acid in the formation of M-S silica gel catalyst is about 5 to 25 seconds, and since the product is substantially free of alkali metals, it is ready for ignition. For most purposes, particularly for use in hydrocarbon conversion processes, it is desirable to ignite the catalyst at a temperature of about 800 to 1100° F. for a period of several hours, e. g. 2 to 10 hours. Care is usually required during ignition to prevent overheating resulting from combustion of organic matter adsorbed on the catalyst. The rapid conversion of the silicic acid to dry M-S catalyst is conducive to the formation of the strong particles which have had no contact with other particles or with any solid surfaces before drying. Absence of salts insures freedom from salt crystals forming on drying and weakening the gel structure. As a result the spherical particles obtained by my improved method of catalyst manufacture have an unblemished spheroidal surface and, accordingly, are much stronger than the catalyst particles prepared by the methods employed heretofore where the surfaces of the particles were distorted and damaged by contact with solid surfaces and the surfaces of other catalyst particles.

In the preparation of the microspheres by dispersing the silica sol followed by simultaneous gelling and drying of the microspherical particles, it has been found desirable to control the conditions of operation with respect to rates of gelling and drying so that gelling is effected before sufficient drying has occurred to produce a substantially impervious film on the surface of the particle. Otherwise, distortion of particles from the effect of surface tension forces and shrinkage by loss of water will sometimes result in rupturing the particles and producing misshapen forms instead of the spheroidal form desired.

In order to obtain the desired control of drying and gelling rates, the gelling rate may be speeded by adjusting the pH just before spraying. Another method of increasing gelling rate is by means of a volatile alkali stabilizer, e. g. ammonia or amine, dissolved in the sol which is rapidly lost by evaporation on spraying. Where the rate of gelling is relatively slow, the sol may be sprayed into the top of a high tower and the temperature and humidity controlled to allow adequate time for gelling before excessive drying occurs. Thus, a 20 per cent silica sol prepared in the above manner and adjusted to a pH of approximately 7, gave perfect microspheres when sprayed into the top of a 150 foot tower in which the air column had a temperature of approximately 80° F. and a humidity in the range of 60 to 75 per cent. If desired, the rate of drying can be controlled by regulating the humidity. Thus the humidity may be maintained high in the top of the drying tower and low at the bottom, thereby allowing gelation of newly formed sol particles to occur without appreciable drying or objectionable film formation, after which the particles are completely dried in the lower portion of the drying tower. In general, high temperatures should be avoided in the drying operation because of the difficulty of regulating the drying rate when high temperatures are used. It is preferred to operate at temperatures in the range of 75 to 150° F.

Where reference has been made to silica gel substantially free of alkali metals, it is intended that such gels contain not more than about one part of alkali metal oxide, e. g. $Na_2O$ per 100 parts of $SiO_2$ and for most purposes it is preferred that the amount of $Na_2O$ be no more than about 1 to 5 parts per 1000 parts of $SiO_2$.

As indicated hereinabove, various promoter metals may be applied to my M-S silica gel catalyst either by adding to the silicic acid before dispersing and drying or by impregnating the dried M-S catalyst with the appropriate solution of the desired metal. Thus, I may impregnate with ammonium chromate or ammonium molybdate when adding chromium or molybdenum. Other metals which may be impregnated as promoters include vanadium, manganese, iron, cobalt, nickel, copper, zinc, titanium, thorium and zirconium, the amount required being of the order of 1 to 10 per cent.

As pointed out hereinabove, my process of making M-S silica catalyst avoids damage to the catalyst particles from washing. Another advantage of my process is the improved physical form and structure of the spherical silica particles resulting from drying in the absence of alkali metal salts. By removing the alkali metal ions from the silica solution before dispersion and drying, substantially no strong electrolytes are present to be concentrated and crystallized on evaporation of the water from the gelled particles intermediate in the drying step. When M-S silica gel catalyst is prepared in the usual manner in the presence of the by-product alkali metal salts they contain, it is difficult to prevent the gel from crumbling to a fine powder as it shrinks in the drying operation. The by-product alkali metal salts do not shrink and on crystallizing they introduce strains in the gel resulting in the formation of weakened and friable microspheres. By my invention I avoid this undesirable effect and find it possible to prepare strong microspheres from silica solutions containing as little as 5 to 10 per cent $SiO_2$ where the shrinkage obtained on drying amounts to 10-20 fold by volume. The ion exchange resins which I may employ are commonly high molecular weight organic substances which have the ability to combine with alkali metals forming insoluble compounds therewith. Exchangers of this type have been made by treatment of coals with sulfuric acid to produce sulfonation. After use for a period of time they become substantially saturated with the alkali metal ion and require regeneration which may be effected by treating with acid, for example dilute hydrochloric or sulfuric acid. As an example of such resins, I refer to the Amberlites made by the Resinous Products Company.

While I have described my invention as it is applied to certain specific modifications, it should be understood that the scope of the invention is determined by the following claims.

I claim:

1. The process of preparing strong microspherical silica catalysts, substantially free of alkali metal, which comprises removing the alkali metal from an alkali metal silicate solution containing about 2 to 10 per cent $SiO_2$ by passing said alkali metal silicate solution into contact with an ion exchange resin having the power of combining with alkali metal ion, dispersing the resulting silica solution substantially free of alkali metal in a stream of a dehydrating gas whereby the solution is formed into droplets and the droplets are suspended in said gas, maintaining the said droplets in suspension for sufficient time to permit said silica to gel in microspherical form and drying said microspherical gel particles while in suspension in said gas and out of contact with solid surfaces.

2. The process of claim 1 wherein the silica solution substantially free of alkali metal resulting from contacting with said ion exchange resin step is concentrated by evaporation to a silica concentration of about 10 to 20 percent before dispersing and drying.

3. The process of claim 1 wherein a small amount of a salt of a promoter metal selected from the class consisting of vanadium, manganese, iron, cobalt, nickel, copper, zinc, titanium, thorium, zirconium, chromium, molybdenum, aluminum and magnesium is added in solution to said alkali-free silica solution before dispersing and drying.

4. The process of preparing strong microspherical silica gel catalysts substantially free of alkali metal which comprises contacting an alkali metal silicate solution containing about 2 to 10 per cent $SiO_2$ with an ion exchange resin having the ability to absorb the alkali metal ion from said solution, dispersing the resulting silica solution in a stream of drying gas wherein said solution is formed into microspherical droplets which are subsequently gelled and dried out of contact with solid surfaces while in suspension in said gas and out of contact with said surfaces and controlling the size of said droplets by adjusting the viscosity of the silica solution before dispersion.

5. The process of claim 4 wherein the viscosity of said silica solution is adjusted by the addition of a small amount of acid to give a hydrogen ion concentration of about 4 to 7 pH.

6. The process of claim 4 wherein the viscosity of said silica solution is adjusted by adding an organic thickening agent selected from the class consisting of gelatin, agar, tragacanth, and ammonium alginate.

7. The process of preparing strong mircospherical silica catalysts from alkali metal silicates which comprises contacting a solution of an alkali metal silicate containing about 5 to 20 per cent $SiO_2$ with an ion exchange resin having the ability to remove substantially all of the alkali metal ion from said solution, dispersing the resulting silica solution in the form of microspherical droplets substantially free of alkali metal in a stream of a drying gas, maintaining said droplets in suspension in said gas until gelled and dried out of contact with solid surfaces, then recovering and igniting the dried silica catalyst, and increasing the stability of said silica solution obtained in said ion exchange resin contactng step by treating said ion exchange resin with ammonium hydroxide before contacting with said alkali metal silicate solution.

8. The process of preparing strong microspherical silica catalysts which comprises contacting an alkali metal silicate solution containing about 2 to 10 per cent of $SiO_2$ with an ion exchange resin having the power of combining with alkali metal ions, thereby reducing the alkali metal concentration in said solution to not more than five parts per thousand parts of $SiO_2$ present, dispersing the resulting silica solution in the form of fine droplets in a stream of a dehydrating gas, maintaining the said droplets in suspension in said gas for sufficient time to permit the silica to gel in the form of microspherical particles and drying the resulting microspherical particles while in suspension in said gas and out of contact with solid surfaces.

JAMES C. BAILIE.

REFERENCES CITED

The following references are of record in the file of this patent:

UNITED STATES PATENTS

| Number | Name | Date |
|---|---|---|
| 2,384,946 | Marisic | Sept. 18, 1945 |
| 2,244,325 | Bird | June 3, 1941 |
| 2,097,634 | Malan et al. | Nov. 2, 1937 |
| 1,755,496 | Behrman | Apr. 22, 1930 |
| 1,506,118 | Govers | Aug. 26, 1924 |